United States Patent
Dunn et al.

(10) Patent No.: US 7,480,664 B2
(45) Date of Patent: Jan. 20, 2009

(54) COMPOSITE USER INTERFACE AND FRAMEWORK

(75) Inventors: Melissa W. Dunn, Woodinvile, WA (US); Stephen J. Mooney, Seattle, WA (US)

(73) Assignee: Microsoft Corporation, Redmond, WA (US)

(*) Notice: Subject to any disclaimer, the term of this patent is extended or adjusted under 35 U.S.C. 154(b) by 769 days.

(21) Appl. No.: 10/883,139

(22) Filed: Jul. 1, 2004

(65) Prior Publication Data

US 2005/0091250 A1    Apr. 28, 2005

Related U.S. Application Data

(63) Continuation-in-part of application No. 10/692,164, filed on Oct. 23, 2003, now abandoned.

(51) Int. Cl.
    *G06F 7/00* (2006.01)
(52) U.S. Cl. .................. 707/100; 707/203

(58) Field of Classification Search ............. 707/1–5, 707/6, 7, 200–203, 100–102
See application file for complete search history.

(56) References Cited

U.S. PATENT DOCUMENTS

| | | | |
|---|---|---|---|
| 4,937,439 A * | 6/1990 | Wanninger et al. | 235/456 |
| 6,282,318 B1 * | 8/2001 | Dietrich et al. | 382/209 |
| 7,165,078 B2 * | 1/2007 | Lang et al. | 707/201 |
| 2005/0091284 A1 * | 4/2005 | Weissman et al. | 707/200 |

* cited by examiner

*Primary Examiner*—Wilson Lee

(57) ABSTRACT

Computer-implemented methods of processing contact records are provided. A user may merge and unmerge contact records to control which records are synchronized with each other. Identity claims of records may be compared to identify possible duplicate records. Identity claims may include addresses, phone numbers, instant messenger addresses or other contact data that is likely to be uniquely associated with a contact. When possible duplicate contact records are found, a dialog box is displayed that identifies the possible duplicate records and includes an option for merging the possible duplicate contact records.

19 Claims, 14 Drawing Sheets

COMPOSITE USER INTERFACE AND FRAMEWORK

RELATED APPLICATIONS

This application is a continuation-in-part of application Ser. No. 10/692,164, filed Oct. 23, 2003, which was abandoned on Dec. 18, 2007.

FIELD OF THE INVENTION

Aspects of the present invention relate to systems and graphical user interfaces used to manage and display contact information. More specifically, aspects of the present invention provide a single graphical user interface that displays contact information that is synchronized with several different devices and applications.

BACKGROUND

Computer devices are increasingly being used to store contact data. It is not uncommon for a user to store contact data in devices and locations such as mobile phones, personal digital assistants (PDAs), laptop computers and servers connected to the Internet. Synchronization applications have been developed to help users synchronize contact data stored in different locations. For example, after updating a phone number stored in a mobile telephone, a particular synchronization application may be used to synchronize the updated phone number with contact data stored in an application such as Microsoft® Outlook®. The data stored in the same mobile phone may also be synchronized with contact data stored in a proprietary contact application.

One of the common drawbacks associated with storing data, such as contact data, in several different devices and locations is that it is common to have inconsistent data. For example, a user may update a friend's phone number stored on a mobile phone and update the same friend's address stored in a laptop computer. Several weeks later the user may not remember if the phone number stored in the mobile phone or the laptop computer is the most current number. Another common drawback associated with current systems and methods is that users may have redundant data. For example, a user may store a phone number and home address in a contact application under the name Tom Smith and store a work email address and home address under the name Thomas Smith. This results in partial contact information being included in two different records.

Therefore, there is a need in the art for systems and methods that increase the consistency of contact data stored in multiple devices and in multiple locations. There is also a need in the art for systems and methods that reduce the amount redundant contact data.

BRIEF SUMMARY

Aspects of the present invention address one or more of the issues mentioned above, thereby providing systems and methods that increase the consistency of contact data stored in multiple devices and reduce the amount of redundant contact data. A contact database stores a plurality of contact records. Related contact records are linked together so that updating one record results in the updating of the related records. A graphical user interface allows users to merge linked records. The unmerge command may result in the creation of a new composite record and the re-linking of related contact records.

BRIEF DESCRIPTION OF THE DRAWINGS

Aspects of the present invention are described with respect to the accompanying figures, in which like reference numerals identify like elements, and in which:

FIG. 10 illustrates an exemplary dialog box for resolving conflicts in duplicate contact records, in accordance with an embodiment of the invention;

DETAILED DESCRIPTION

Exemplary Operating Environment

Figure 1:
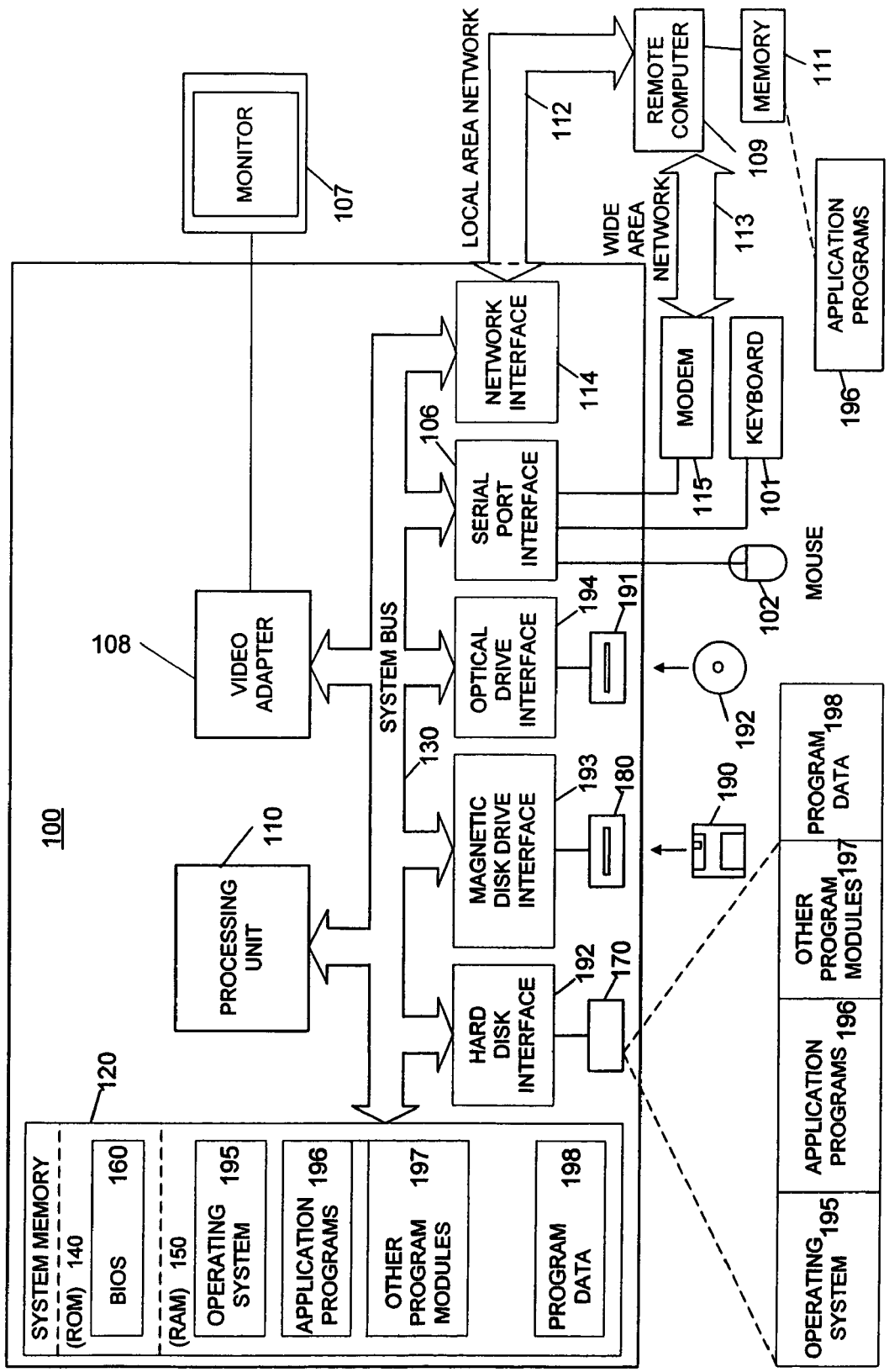
FIG. 1 shows a functional block diagram of a conventional general-purpose computer system.

FIG. 1 is a functional block diagram of an example of a conventional general-purpose digital computing environment that can be used to implement various aspects of the present invention. In FIG. 1, a computer 100 includes a processing unit 110, a system memory 120, and a system bus 130 that couples various system components including the system memory to the processing unit 110. The system bus 130 may be any of several types of bus structures including a memory bus or memory controller, a peripheral bus, and a local bus using any of a variety of bus architectures. The system memory 120 includes read only memory (ROM) 140 and random access memory (RAM) 150.

A basic input/output system 160 (BIOS), containing the basic routines that help to transfer information between elements within the computer 100, such as during start-up, is stored in the ROM 140. The computer 100 also includes a hard disk drive 170 for reading from and writing to a hard disk (not shown), a magnetic disk drive 180 for reading from or writing to a removable magnetic disk 190, and an optical disk drive 191 for reading from or writing to a removable optical disk 192 such as a CD ROM or other optical media. The hard disk drive 170, magnetic disk drive 180, and optical disk drive 191 are connected to the system bus 130 by a hard disk drive interface 192, a magnetic disk drive interface 193, and an optical disk drive interface 194, respectively. The drives and their associated computer-readable media provide nonvolatile storage of computer readable instructions, data structures, program modules and other data for the personal computer 100. It will be appreciated by those skilled in the art that other types of computer readable media that can store data that is accessible by a computer, such as magnetic cassettes, flash memory cards, digital video disks, Bernoulli cartridges, random access memories (RAMs), read only memories (ROMs), and the like, may also be used in the example operating environment.

A number of program modules can be stored on the hard disk drive 170, magnetic disk 190, optical disk 192, ROM 140 or RAM 150, including an operating system 195, one or more application programs 196, other program modules 197, and program data 198. A user can enter commands and information into the computer 100 through input devices such as a keyboard 101 and pointing device 102. Other input devices (not shown) may include a microphone, joystick, game pad, satellite dish, scanner or the like. These and other input devices are often connected to the processing unit 110 through a serial port interface 106 that is coupled to the system bus, but may be connected by other interfaces, such as a parallel port, game port or a universal serial bus (USB). Further still, these devices may be coupled directly to the system bus 130 via an appropriate interface (not shown). A monitor 107 or other type of display device is also connected to the system bus 130 via an interface, such as a video adapter 108. In addition to the monitor, personal computers typically include other peripheral output devices (not shown), such as speakers and printers.

The computer 100 can operate in a networked environment using logical connections to one or more remote computers, such as a remote computer 109. The remote computer 109 can be a server, a router, a network PC, a peer device or other common network node, and typically includes many or all of the elements described above relative to the computer 100, although only a memory storage device 111 has been illustrated in FIG. 1. The logical connections depicted in FIG. 1 include a local area network (LAN) 112 and a wide area network (WAN) 113. Such networking environments are commonplace in offices, enterprise-wide computer networks, intranets and the Internet.

When used in a LAN networking environment, the computer 100 is connected to the local network 112 through a network interface or adapter 114. When used in a WAN networking environment, the personal computer 100 typically includes a modem 115 or other means for establishing communications over the wide area network 113, such as the Internet. The modem 115, which may be internal or external, is connected to the system bus 130 via the serial port interface 106. In a networked environment, program modules depicted relative to the personal computer 100, or portions thereof, may be stored in the remote memory storage device.

It will be appreciated that the network connections shown are illustrative and other techniques for establishing a communications link between the computers can be used. The existence of any of various well-known protocols such as TCP/IP, Ethernet, FTP, HTTP, Bluetooth, IEEE 802.11x and the like is presumed, and the system can be operated in a client-server configuration to permit a user to retrieve web pages from a web-based server. Any of various conventional web browsers can be used to display and manipulate data on web pages.

DESCRIPTION OF ILLUSTRATIVE EMBODIMENTS

Figure 2:
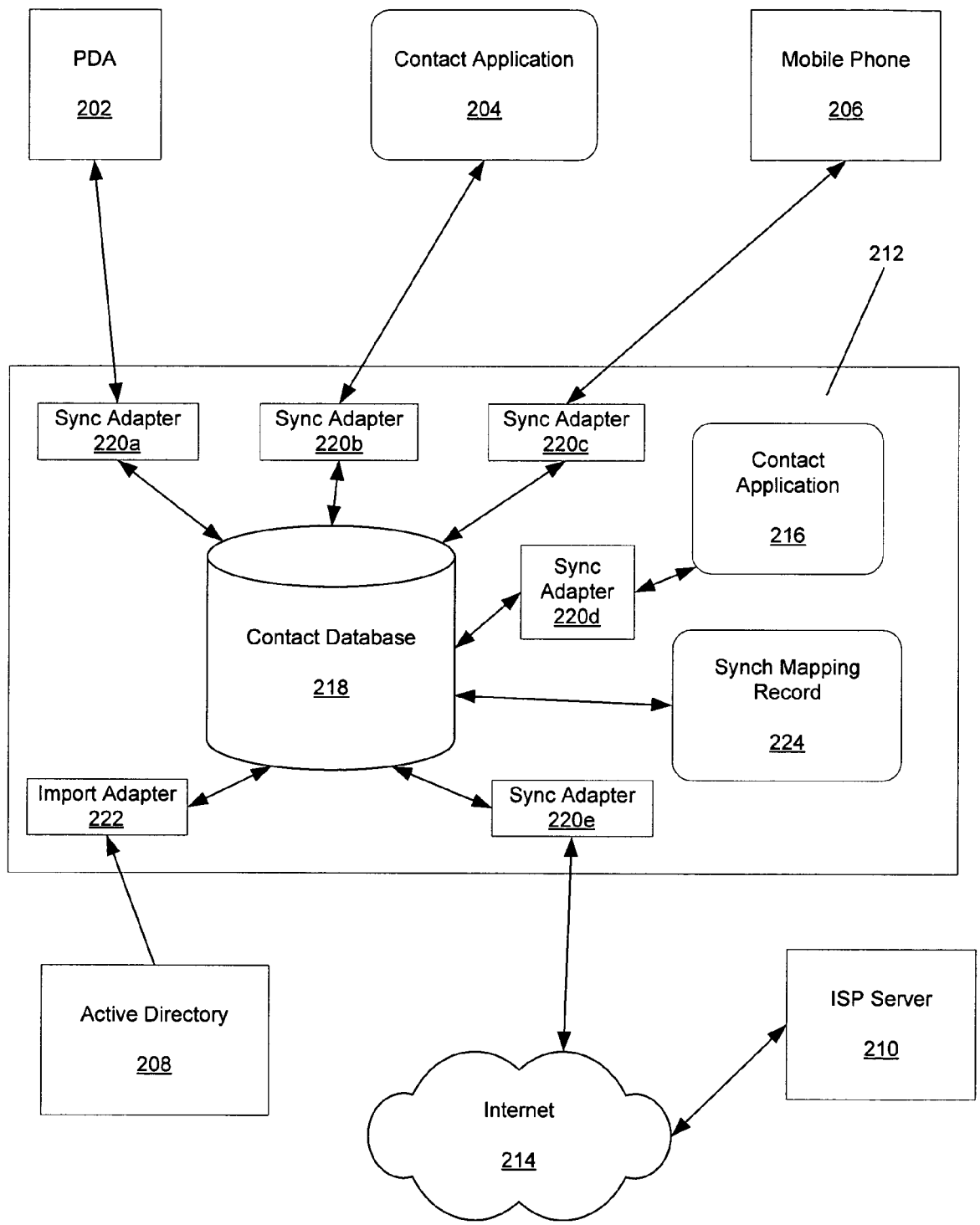
FIG. 2 illustrates a system for synchronizing data stored in a plurality of stores in accordance with an embodiment of the invention.

FIG. 2 illustrates a system for synchronizing data stored in a plurality of stores in accordance with an embodiment of the invention. As used herein, a store may be in the form of a device or a file that may be accessed by an application. The system shown in FIG. 2 includes remote stores implemented with a personal digital assistant 202, a contact application 204, a mobile phone 206, Active Directory 208 and Internet service provider server 210. Remote stores 202, 204 and 206 may be connected directly to a computer device 212. The connections may be via one or more docking cradles, USB cables, infrared links or any other conventional mechanism used to connect a device to a computer device. Remote stores 208 and 210 may be connected to computer device 212 via the Internet 214. Computer device 212 may include one or more internal stores, such as contact application 216. In one embodiment, contact application 216 is implemented with Microsoft® Outlook®. One skilled in the art will appreciate that the aspects of the invention are not limited to the stores and data connections shown in FIG. 2.

Computer device 212 includes a contact database 218 for storing contact information. Contact information may include names, addresses, phone numbers, email addresses, instant messenger identifications, etc. In alternative embodiments of the invention, contact database 218 may also store other data, such as digital certificates, passwords, playlists, data files or any other data that a user wishes to synchronize with a store. Moreover, the function of the single database 218 may be performed with two or more databases. For example, a first database may store contact data and a second database may store playlists.

A plurality of synchronization adapters 220a-220e are used to synchronize data stored in contact database 218 and stores 202, 204, 206, 210 and 216. One skilled in the art will appreciate that structure of any particular synchronization adapter may be a function of the type of store and an application programming interface (API) that is used to access data stored in contact database 218. One or more stores may be configured to not allow a user to manage data stored in that store. Active Directory 208, for example, allows users to read data, but not to write data. Active Directory 208 may be connected to computer device 212 via an import adapter 222. Import adapter 222 is used to transfer data from Active Directory 208 to contact database 218.

A synchronization mapping record 224 may include rules, constraints or other information that governs the synchronization of data. For example, if mobile phone 206 only allows a user to store two phone numbers per name, a constraint in synchronization mapping record 224 may prevent more than two phone numbers per name from attempting to be synchronized with the data stored in mobile phone 206.

Figure 3:
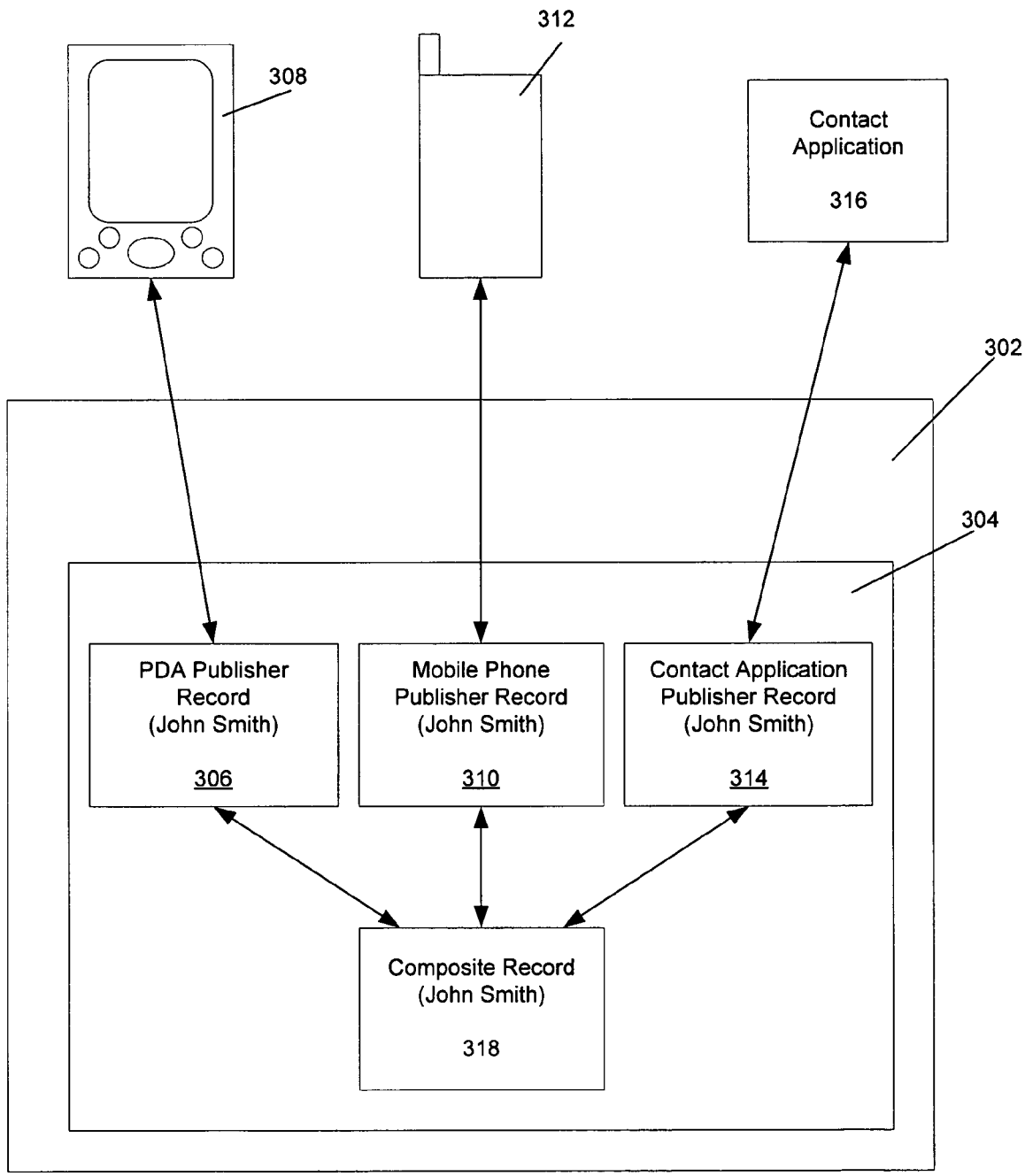
FIG. 3 illustrates a system that may be used to synchronize data with three stores and a database, in accordance with an embodiment of the invention.

FIG. 3 illustrates a system that may be used to synchronize data with three stores and a database, in accordance with an embodiment of the invention. A computer device 302 may be similar to computer device 212. Computer device 302 includes an operating system 304. A PDA publisher record 306 includes contact data that is synchronized with a PDA 308. A mobile phone publisher record 310 includes contact data that is synchronized with a mobile phone 312. A contact application publisher record 314 includes contact data that is synchronized with a contact application 316. In the embodiment shown, publisher records 306, 310 and 314 include contact data for a contact named "John Smith."

PDA publisher record 306, mobile phone publisher record 310 and contact application publisher record 314 each synchronize with a composite record 318. Publisher records 306, 310 and 314 and composite record 318 may be included within contact database 218 (shown in FIG. 2). In an exemplary implementation, a user may update John Smith's contact information stored in PDA 308. Synchronizing PDA 308 with computer device 302 causes PDA publisher record 306 to include the updated contact information. The updated contact information is then synchronized with composite record 318. Composite record 318 may then be synchronized with mobile phone publisher record 310 and contact application publisher record 314. The next time that mobile phone 312 is synchronized with computer device 302, the contact data stored in mobile phone 312 is synchronized with mobile phone publisher record 310. The contact data stored in contact application 316 may be synchronized in a similar manner. Of course, composite record 314 may be synchronized with a plurality of additional publisher records, which will lead to the synchronization of data stored in additional stores.

In the embodiment shown in FIG. 3, records 306, 310, 314 and 318 are shown located within operating system 304. One of the advantages of locating the records within an operating system is that the number of APIs required to update data stored in several different stores can be minimized. In one embodiment of the invention, a single API is used to manage the data stored within publisher records, such as PDA publisher record 306, mobile phone publisher record 310 and contact application publisher record 314. This is in contrast to prior art systems in which a given store might be required to use one API for synchronizing data with data stored in a first application, a second API for synchronizing data with data stored in a second application, and so on.

Figure 3A:
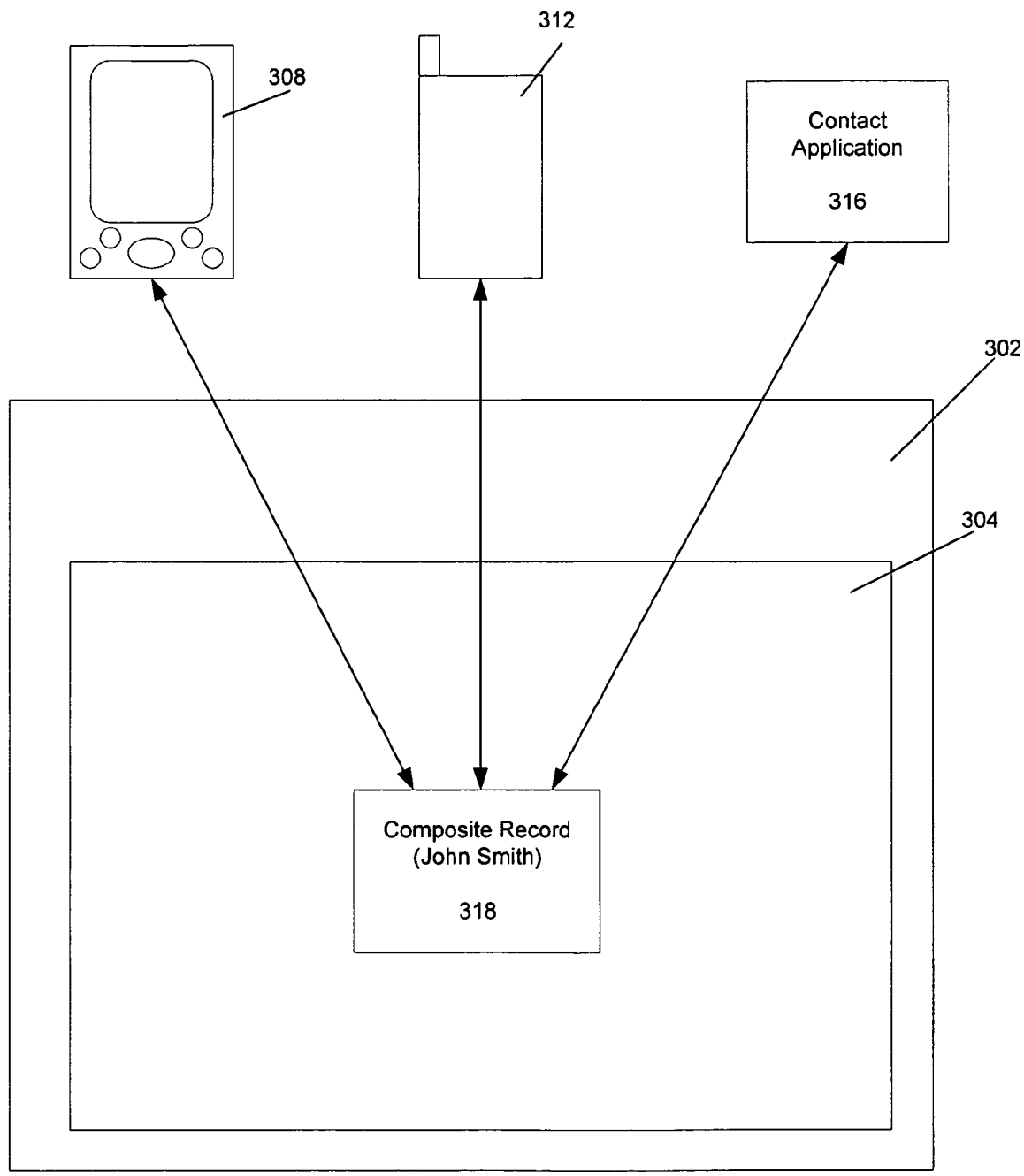
FIG. 3a illustrates another system that may be used to synchronize data with three stores and a database, in accordance with an embodiment of the invention.

FIG. 3a illustrates another system that may be used to synchronize data with three stores and a database, in accordance with an embodiment of the invention. A computer device 302 may be similar to computer device 212. Computer device 302 includes an operating system 304.

Instead of synchronizing contact information with a publisher record, the three data stores synchronize directly with a composite record 318. In an exemplary implementation, a user may update John Smith's contact information stored in PDA 308. Synchronizing PDA 308 with computer device 302 causes the contact information to be synchronized with composite record 318. Thus, the next time that mobile phone 312 is synchronized with computer device 302, the contact data stored in mobile phone 312 is synchronized with composite record 318. The contact data stored in contact application 316 may be synchronized in a similar manner. Of course, composite record 314 may be synchronized with the data stored in a plurality of additional stores.

Figure 4:
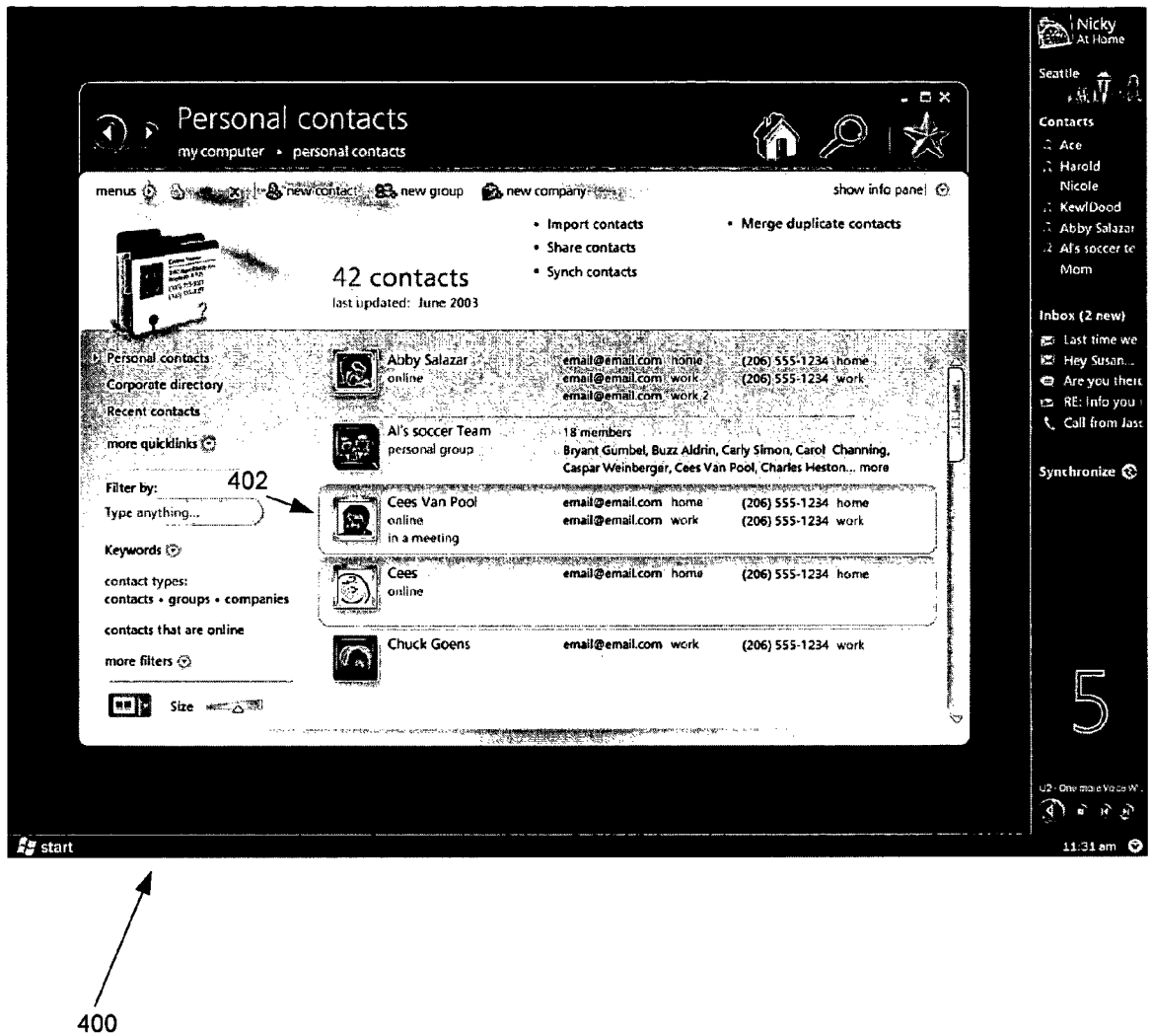
FIG. 4 illustrates a graphical user interface that shows contact data for a plurality of contacts, in accordance with an embodiment of the invention.
Figure 5:
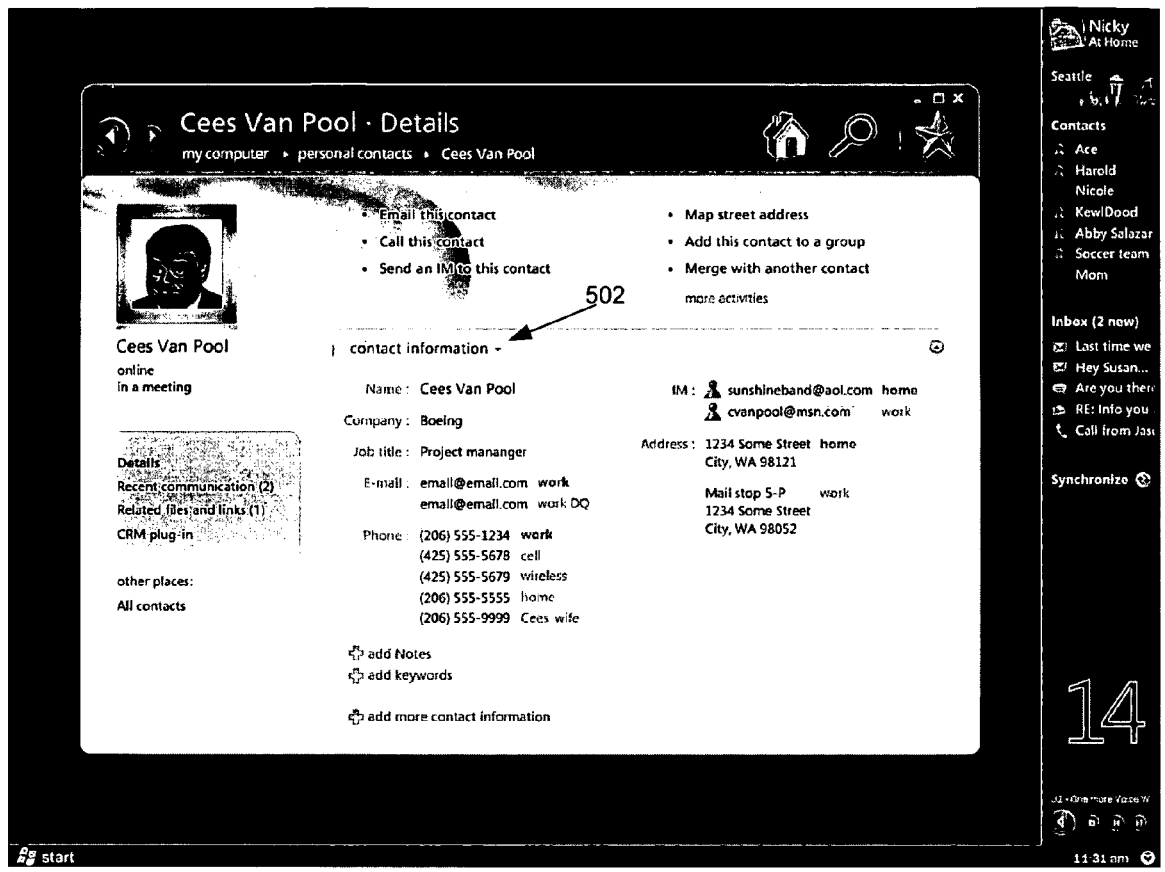
FIG. 5 illustrates a user interface that includes contact data stored in a composite record, in accordance with an embodiment of the invention.
Figure 6:
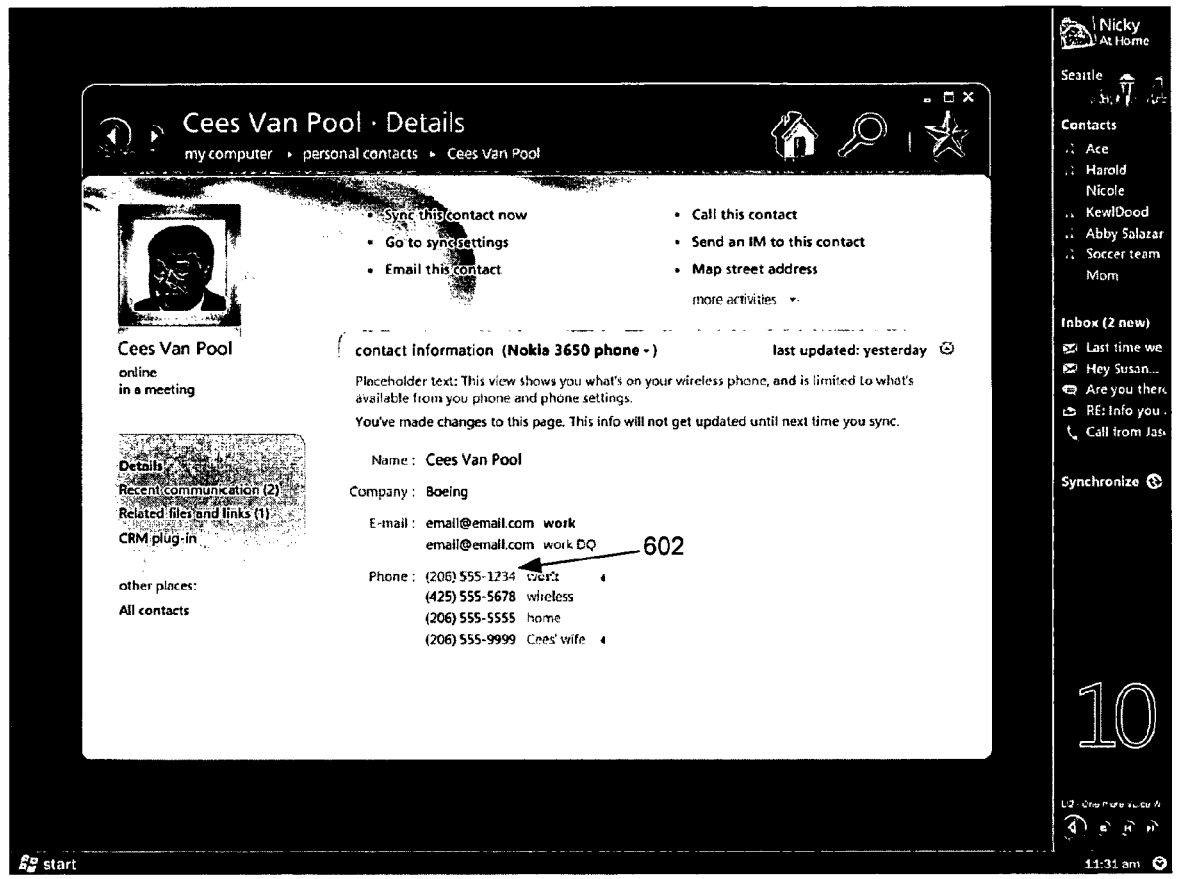
FIG. 6 illustrates a user interface that includes contact data stored in a mobile phone publisher record, in accordance with an embodiment of the invention.

FIG. 4 illustrates a graphical user interface 400 that shows contact data for a plurality of contacts. Additional contact information may be displayed by selecting a particular contact. For example, selecting contact 402 causes a graphical user interface 500 (shown in FIG. 5) to be displayed. User interface 500 may include all of the contact data stored in a composite record. A drop down menu 502 may be used to select graphical user interfaces that display contact data stored in publisher records. User interface 600 (shown in FIG. 6) includes contact data stored in a mobile phone publisher record. User interface 600 may also include contact data that is stored in a composite record, but not in the corresponding publisher record, if it exists. Field 602, for example, is displayed in a faded font to indicate that the field is not included in the publisher record. Icons or other formatting options may also be used to indicate which fields are not included within a publisher record. The mobile phone that corresponds to user interface 600 may only be capable of storing 3 phone numbers per contact. As a result, the phone number in field 602 is not synchronized with the data in the mobile phone and may not be included within the mobile phone publisher record.

Figure 7:
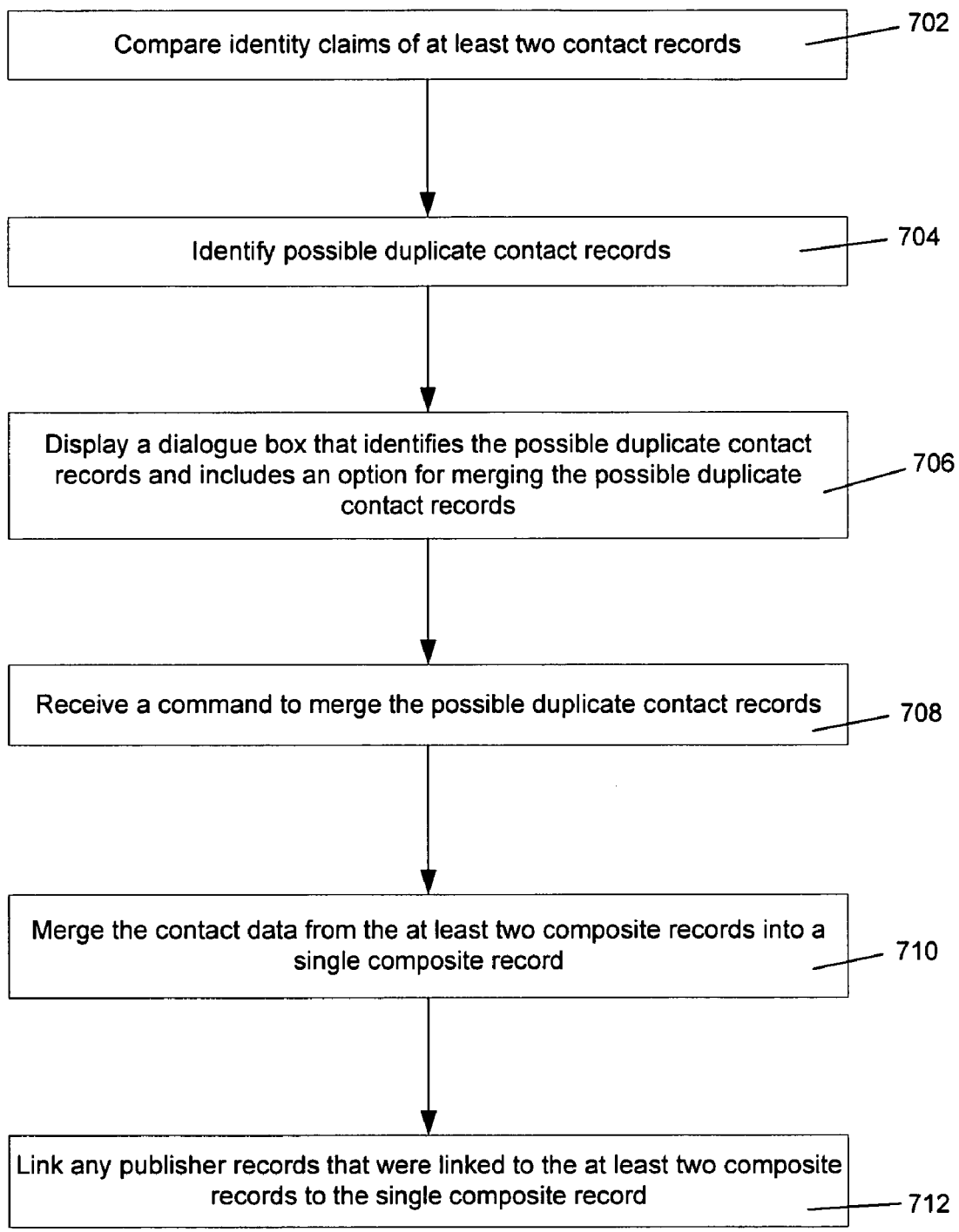
FIG. 7 illustrates a computer-implemented method of merging duplicate contact records, in accordance with an embodiment of the invention.

FIG. 7 illustrates a computer-implemented method of merging duplicate contact records, in accordance with an embodiment of the invention. Duplicate contact records may result from user synchronizing contact data from different stores. For example, a user may store contact data in a mobile phone and identify the contact as John Smith. Additional contact data may be stored in PDA which identifies the contact as Jonathan Smith. First, in step 702 identity claims of at least two contact records are compared. The contact records may include various combinations of publisher records and composite records. Identity claims may include phone numbers, addresses or other information that is likely to uniquely identify a contact. The example given above shows that names are not good identity claims because it is common to have minor variations in names.

Figure 8:
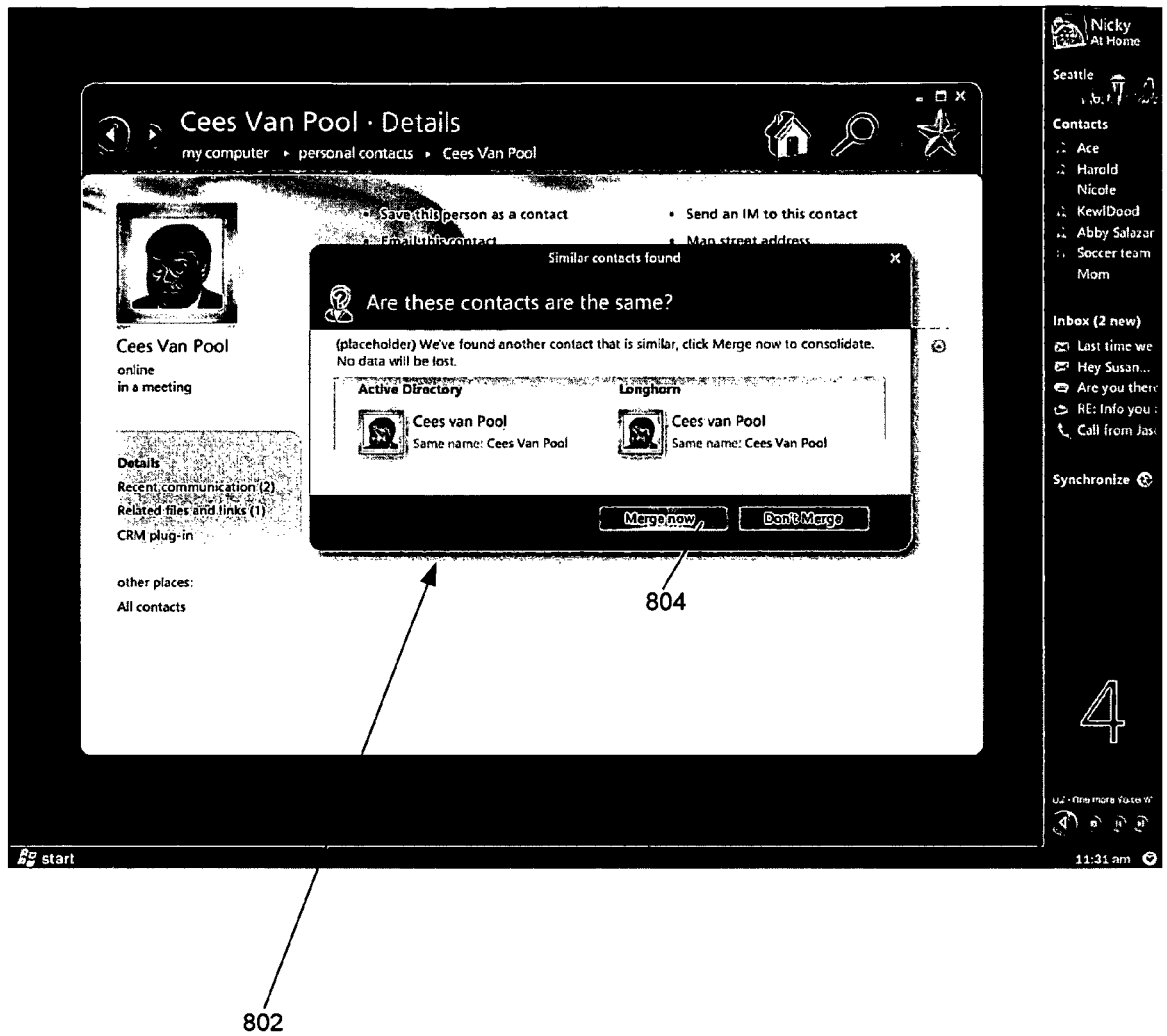
FIG. 8 illustrates an exemplary dialog box for unmerging records, in accordance with an embodiment of the invention.

In step 704 possible duplicate contact records are identified. Possible duplicate contact records may correspond to contact records having the same identity claims. In step 706 a dialog box is displayed that identifies the possible duplicate contact records and includes an option for merging the possible duplicate contact records. FIG. 8 illustrates an exemplary dialog box 802. Dialog box 802 identifies the stores that are the sources of possible duplicate contact records. Dialog box 802 may also list the contact data that is the same for each of the contact records. For example, dialog box 802 may display the identity claims that resulted in the contact records being identified as possible duplicates.

In step 708 a command to merge the possible duplicate records is received. The user may select merging now button 804 to cause contact records to be merged. In steps 710, the contact data from the at least two composite records is merged into a single composite record. For example, if one composite record corresponds to a contact identified as John Smith and a second composite record corresponds to a contact identified as Jonathan Smith, the contact data from both records would be merged into a single composite record that identify the contact with a single name. Finally, in step 712, the publisher records that were linked to the original composite records are linked to the single composite record. Re-linking the publisher records to the composite record ensures that contact data will be synchronized appropriately.

Figure 7A:
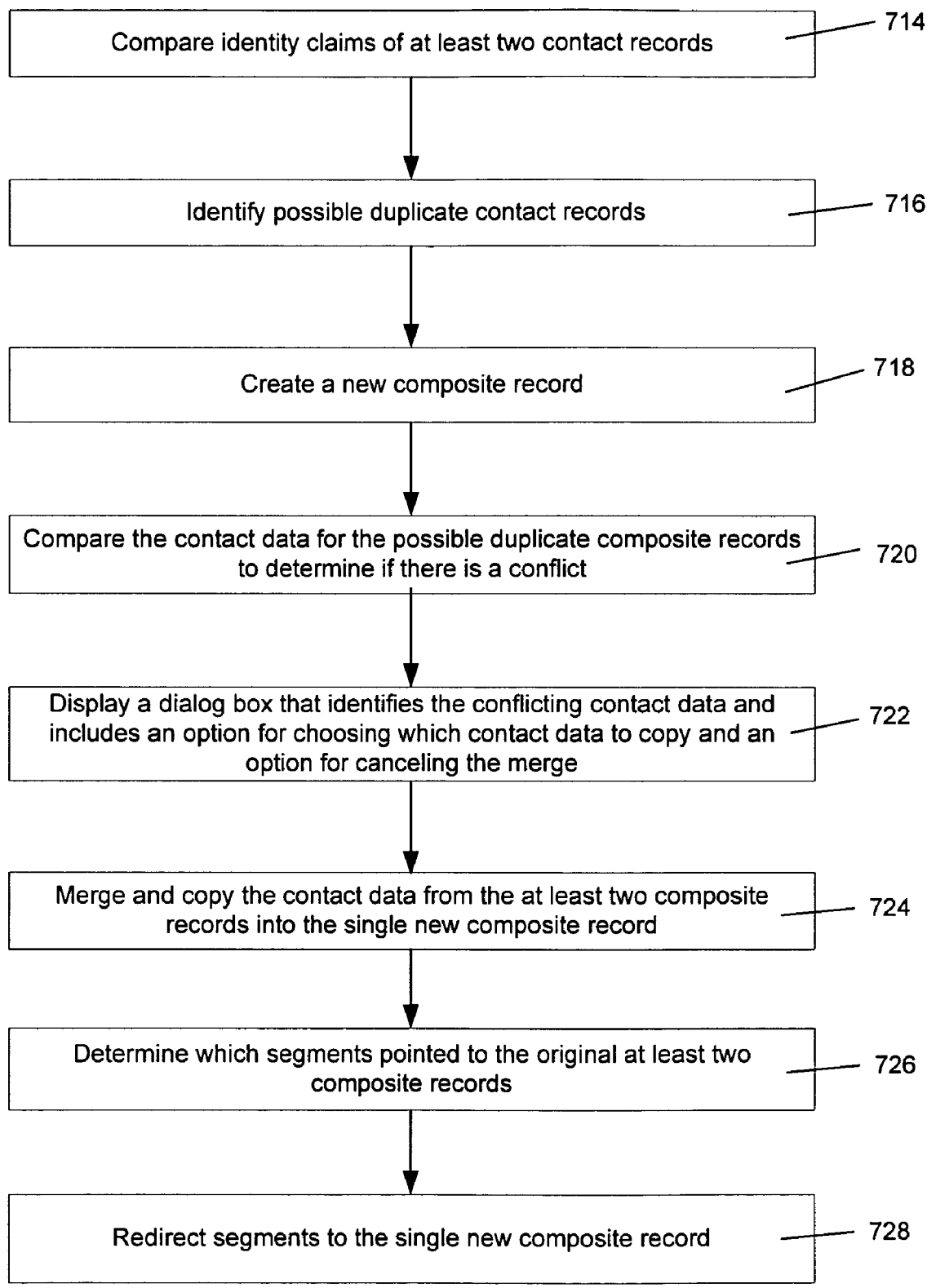
FIG. 7a illustrates a computer-implemented method of merging duplicate contact records, in accordance with an embodiment of the invention.
Figure 12:
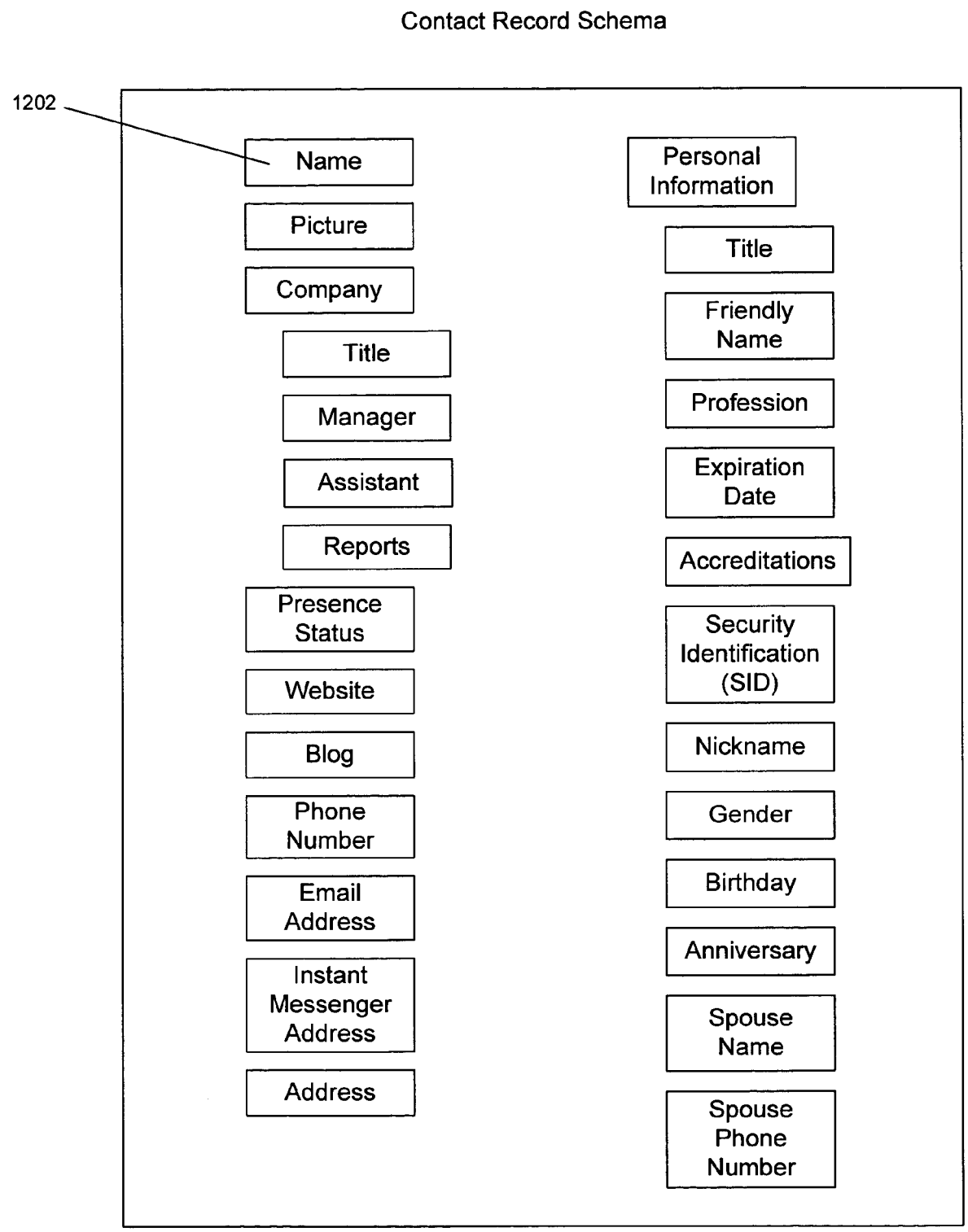
FIG. 12 illustrates an exemplary contact record schema, in accordance with an embodiment of the invention.

FIG. 7a illustrates a computer-implemented method of merging duplicate contact records, in accordance with yet another embodiment of the invention. First, in step 714 identity claims of at least two contact records are compared. The contact records may include various combinations of composite records. Identity claims may include phone numbers, addresses or other information that is likely to uniquely identify a contact. FIG. 12 identifies exemplary types of identity claims that may be identified for a given contact. Name identity claim 1202 represents an exemplary identity claim. The example given above shows that names are not good identity claims because it is common to have minor variations in names. The data shown in FIG. 12 may be arranged in accordance with a markup language schema, such as an XML schema, to facilitate parsing, organizing, searching, etc.

In step 716 possible duplicate contact records are identified. Possible duplicate contact records may correspond to contact records having the same identity claims. FIG. 8 illustrates an exemplary dialog box 802. Dialog box 802 identifies the stores that are the sources of possible duplicate contact records. Dialog box 802 may also list the contact data that is the same for each of the contact records. For example, dialog box 802 may display the identity claims that resulted in the contact records being identified as possible duplicates.

In step 718 a new composite record for the duplicate records may be created. The data from the duplicate contact records, i.e. the composite records for the duplicate records, will be merged into the new composite record. Alternatively, a composite record may be modified to incorporate data included in another contact record. That is, the data from two or more composite records may be combined without creating a new composite record. In step 720 the contact data for the duplicate records is compared so that any conflicts in the duplicate contact records can be resolved. For example, if one composite record corresponds to a contact identified as John Smith and a second composite record corresponds to a contact identified as Jonathan Smith, the records may be duplicates but would have conflicting identity claims. Once the conflict is resolved, the contact data from both records would be merged into a new composite record that identifies the contact with a single name.

Figure 10:
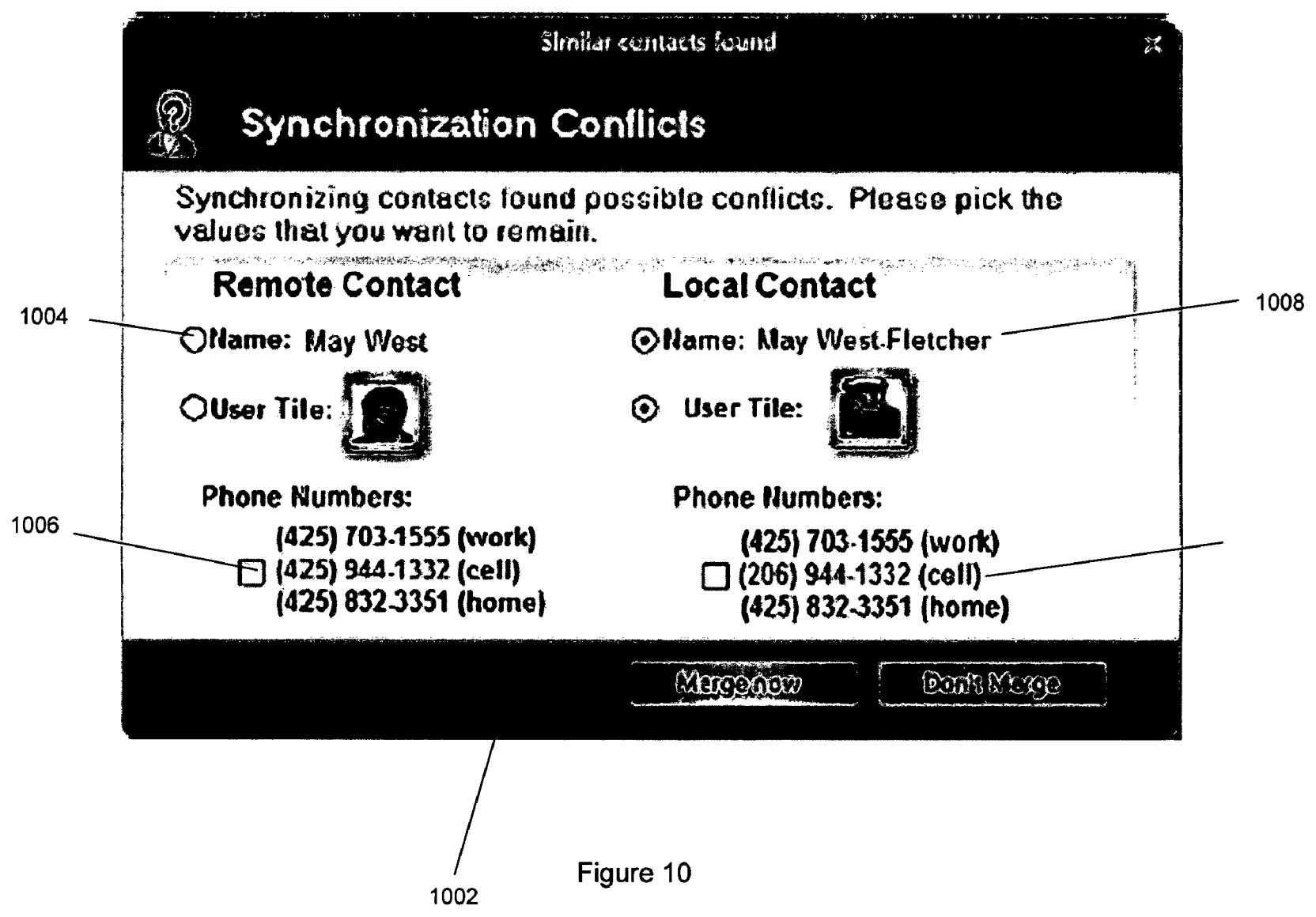

In step 722, a dialog box may be displayed to the user identifying conflicting data in the duplicate contact records, e.g a conflicting contact name as described above, and the user is given an option to choose which contact name should be used for the new contact record or to cancel the merge all together. An exemplary dialog box is depicted in FIG. 10. Once the user resolves the conflicting data as described, the data from the duplicate contact records is copied (or merged) into the single new composite record.

Finally, in steps 726 and 728, any data stores that pointed to the original composite records are linked or redirected to the single or new composite record. Re-linking the data stores to the new composite record ensures that contact data will be synchronized appropriately.

In another embodiment of merging contact records, contact data is merged to form a union of properties. For example, the contact data of one contact record may contain the phone number "(206) 123-4567" and the contact data of a second contact record may contain the phone number "123-4567 (home)." According to the embodiment, the phone numbers would be merged to show a union of properties, "(206) 123-4567 (home)" as the resulting phone number.

Figure 9:
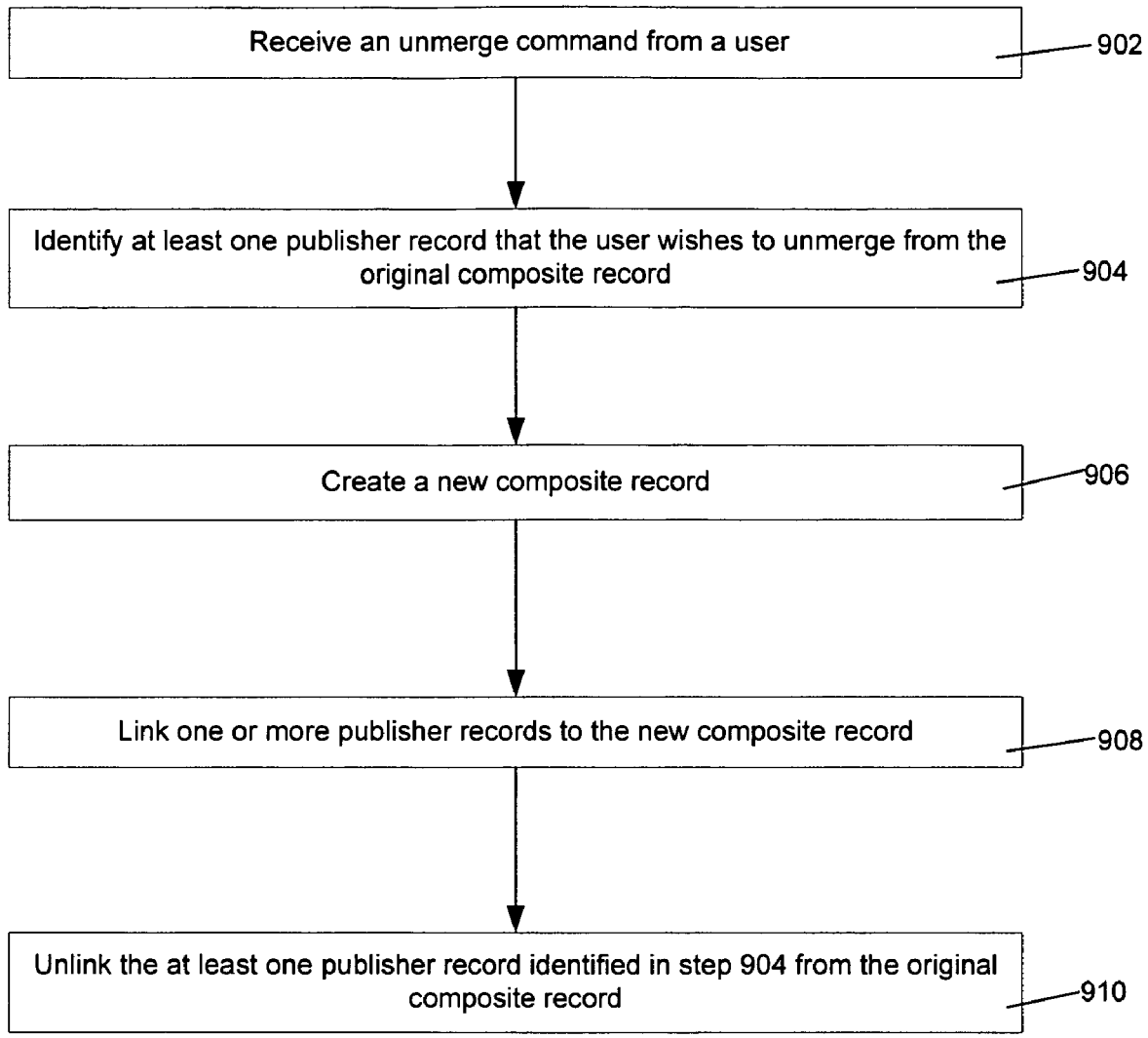
FIG. 9 illustrates a computer-implemented method for unmerging contact data records in accordance with an embodiment of the invention.

FIG. 9 illustrates a computer-implemented method for unmerging contact data records in accordance with an embodiment of the invention. It may be desirable to unmerge contact records when a user mistakenly merges two contact records. First, in step 902, an unmerge command is received from a user. A user may provide an unmerge command by making an appropriate selection in a user interface, such as user interface 500 shown in FIG. 5. In step 904 at least one publisher record that a user wishes to unmerge from a composite record is identified. Referring to the embodiment shown in FIG. 3, step 904 may include identifying a publisher record, such as contact application publisher record 314. In step 906 a new composite record is created. One or more publisher records are linked to the new composite record in step 908. The publisher records that are linked to the new composite record are the publisher records that are unmerged. Next, in step 910 the unmerged publisher records that are identified in step 904 are unlinked from the original composite record. Steps 908 and 910 result in the unmerged publisher records properly synchronizing with a new composite record instead of synchronizing with the original composite record.

FIG. 10 represents an exemplary dialog box 1002 for resolving conflicts in identity claims. As discussed above, contact records can be duplicates but still contain conflicting identity claims. For example, the duplicate records identified in dialog box 1002 have conflicting names "May West" 1004 and "May West-Fletcher" 1008.

Figure 11:
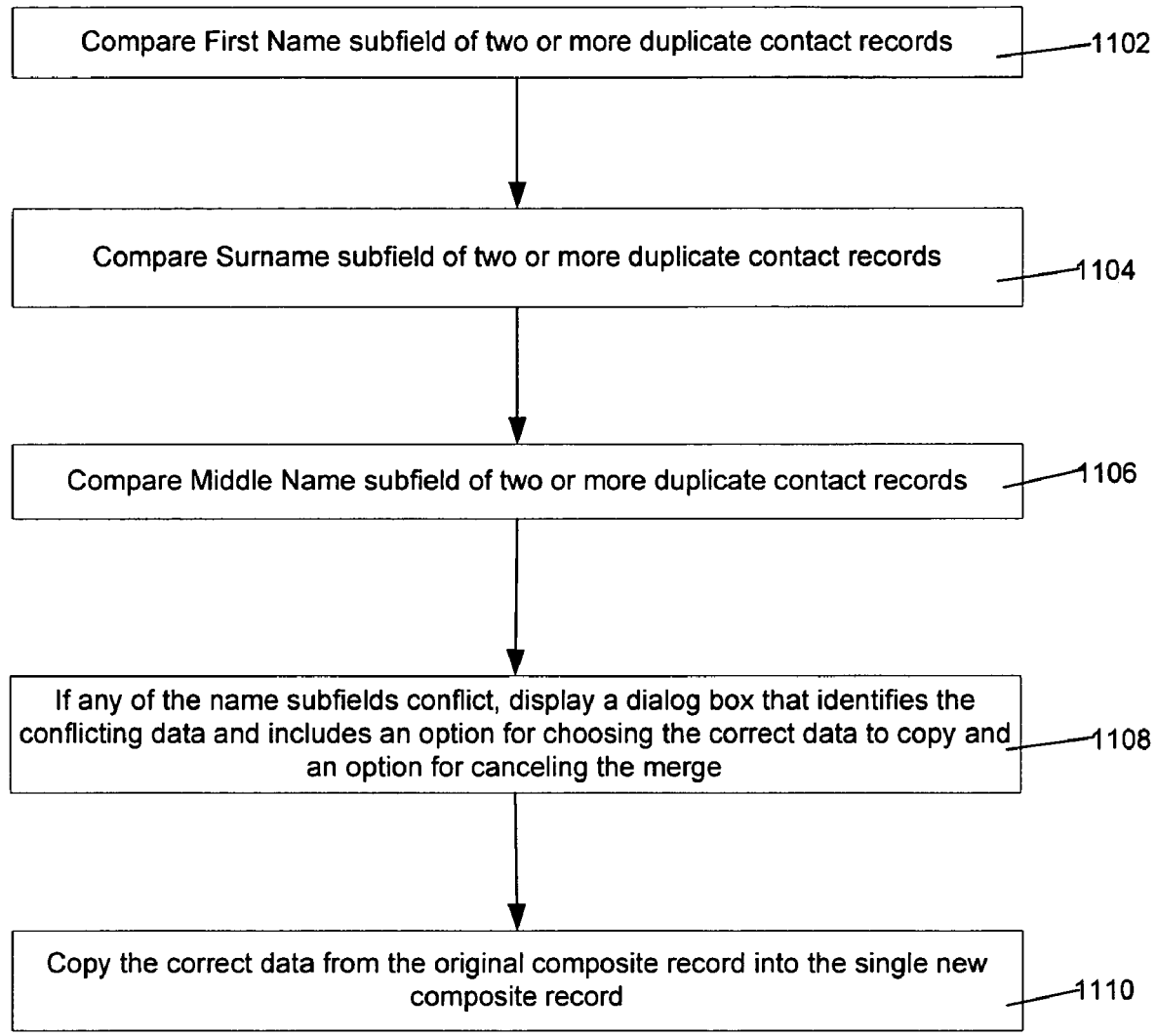
FIG. 11 illustrates a computer-implemented method for resolving conflicts in duplicate contact records, in accordance with an embodiment of the invention.

FIG. 11 represents an exemplary computer-implemented method for resolving conflicting name identity claims. In duplicate contact records, such as exemplified in dialog box 1002 certain subfields (i.e. First Name, Middle Name, or Surname) may conflict. First, in step 1102, the First Name subfields of the duplicate contact records are compared to determine if the entries conflict. For example, First Name "May" 1004 would be compared to First Name "May" 1008, and the First names would be determined not to be in conflict. Next, in steps 1104 and 1106 the remaining subfields are compared to identify conflicting entries. For example, Surname "West" 1004 would be compared to Surname "West-Fletcher" 1008, and the Surnames would be determined to be in conflict.

In step 1108, if any of the subfields within the duplicate contact records were identified as conflicting, a dialog box 1002 may be displayed to allow the user to choose the correct data to be included in a merged composite record for the duplicate contact records. Finally, the correct data from the duplicate contact records may be copied or merged into a single composite record in step 1110. Of course, step 1110 may alternatively include merging data into a single existing record. The method described in FIG. 11 can similarly be used for resolving conflicts in other types of identity claims such as conflicting phone numbers and addresses. It is further noted that some embodiments of the present invention may contain processes to automatically resolve conflicting identity claims such that no user interaction is required.

The present invention has been described in terms of preferred and exemplary embodiments thereof. Numerous other embodiments, modifications and variations within the scope and spirit of the appended claims will occur to persons of ordinary skill in the art from a review of this disclosure.

We claim:

1. A computer-implemented method of processing possible duplicate data records, the method comprising:
   (a) comparing identity claims of at least two data records, wherein the at least two data records are part of a computer operating system;
   (b) identifying possible duplicate data records including a first possible duplicate data record and a second possible duplicate data record, the first possible duplicate data record being linked with a first publisher record, the first publisher record including first data from the first possible duplicate data record, wherein the first data is synchronized, through the first publisher record, between the first possible duplicate data record and an application, the second possible duplicate data record being linked with a second publisher record, the second publisher record including second data from the second possible duplicate data record, wherein the second data is synchronized, through the second publisher record, between the second possible duplicate data record and the application;
   (c) creating a merged data record consisting of reconciled identity claims of the at least two data records;
   (d) linking the first publisher record with the merged data record; and
   (e) linking the second publisher record with the merged data record.

2. The method of claim 1, further comprising the step of displaying a dialogue box that identifies the possible duplicate data records and includes an option for merging the possible duplicate data records.

3. The method of claim 1, wherein the identity claims comprises one or more phone numbers included in the data records.

4. The method of claim 1, wherein the identity claims comprises one or more addresses included in the data records.

5. The method of claim 1, wherein the identity claims comprises one or more electronic messaging addresses included in the data records.

6. The method of claim 1, wherein the identity claims comprises one or more birthdates included in the data records.

7. The method of claim 1, wherein the data records comprises metadata records.

8. The method of claim 1, wherein (a) is performed after data in a composite record is synchronized with data in a store.

9. The method of claim 1, wherein (a) is performed after receiving a command from a user.

10. The method of claim 1, wherein the at least two data records consists of at least two composite records.

11. The method of claim 1, further including the step of receiving a command to merge the possible duplicate data records.

12. The method of claim 1, further comprising:
in response to an unmerge command, creating a new data record, and linking the first publisher record with the new data record.

13. The method of claim 10, wherein (c) comprises:
creating a new composite record; and
merging the data from the at least two composite records into the new composite record.

14. The method of claim 13, further including the step of redirecting a pointer from one of the at least two composite records to the new composite record.

15. The method of claim 12, wherein the single composite record is one of the at least two composite records.

16. The method of claim 1, further including the step of identifying and resolving conflicts in possible duplicate data records.

17. The method of claim 1, wherein (c) comprises creating a data record that includes the union of data included within the at least two data records.

18. A computer-readable medium containing computer executable instructions for performing the steps comprising:
(a) comparing identity claims of at least two data records, wherein the at least two data records are part of a computer operating system;
(b) identifying possible duplicate data records, including a first possible duplicate data record and a second possible duplicate data record, the first possible duplicate data record being linked with a first publisher record, the first publisher record including first data from the first possible duplicate data record, wherein the first data is synchronized, through the first publisher record, between the first possible duplicate data record and an application, the second possible duplicate data record being linked with a second publisher record, the second publisher record including second data from the second possible duplicate data record, wherein the second data is synchronized, through the second publisher record, between the second possible duplicate data record and the application;
(c) creating a merged data record consisting of reconciled identity claims of the at least two data records;
(d) linking the first publisher record with the merged data record; and
(e) linking the second publisher record with the merged data record.

19. The computer-readable medium of claim 18, wherein the identity claims comprises one or more phone numbers included in the data records.

* * * * *